United States Patent [19]

Garon

[11] Patent Number: 4,936,416

[45] Date of Patent: Jun. 26, 1990

[54] THEFT RESISTANT PORTABLE TREE STAND WITH ENHANCED STABILITY

[76] Inventor: Joseph M. Garon, 44455 Brookside, Plymouth, Mich. 48170

[21] Appl. No.: 255,851

[22] Filed: Oct. 11, 1988

[51] Int. Cl.⁵ .................. A45F 3/26; A01M 31/02; A47C 9/10

[52] U.S. Cl. .................................... 182/187; 108/152

[58] Field of Search ............... 182/187, 188; 108/152; 24/68 C, 68 D; 248/231, 499

[56] References Cited

U.S. PATENT DOCUMENTS

| | | | |
|---|---|---|---|
| 1,409,800 | 3/1922 | Turner | 182/187 |
| 1,701,940 | 2/1929 | Alexander | 248/231 |
| 1,825,117 | 9/1931 | Hudson | 248/231 |
| 1,826,120 | 10/1931 | Booth | 182/187 |
| 3,419,108 | 12/1968 | Mobbs | 182/187 |
| 4,411,335 | 10/1983 | Forrester | 182/187 |
| 4,552,247 | 11/1985 | Purdy | 182/187 |
| 4,589,522 | 5/1986 | Shelton | 182/187 |
| 4,592,446 | 6/1986 | White | 182/93 |
| 4,596,309 | 6/1986 | Venson | 182/187 |
| 4,597,473 | 7/1986 | Peck | 182/187 |
| 4,600,081 | 7/1986 | Wade | 182/187 |
| 4,600,082 | 7/1986 | Rauls | 182/187 |
| 4,601,364 | 7/1986 | York | 182/187 |
| 4,603,757 | 8/1986 | Hollinger | 182/187 |
| 4,605,097 | 8/1986 | Maxwell | 182/92 |
| 4,614,252 | 9/1986 | Tarner | 182/116 |
| 4,625,833 | 12/1986 | Lewis | 182/187 |
| 4,648,483 | 3/1987 | Skyba | 182/187 |
| 4,667,773 | 5/1987 | Davis | 182/187 |
| 4,674,598 | 6/1987 | Sides | 182/116 |
| 4,687,074 | 8/1987 | Green | 182/3 |
| 4,691,804 | 9/1987 | Bunker | 182/187 |
| 4,782,918 | 11/1988 | Brunner | 182/187 |

*Primary Examiner*—Reinaldo P. Machado
*Attorney, Agent, or Firm*—J. Gordon Lewis

[57] ABSTRACT

A hunter's tree stand includes a vertically elongated rigid frame assembly including upper and lower tree contacting standoff points. An elongated inelastic band member encircles the tree in a horizontal plane disposed vertically intermediate the standoff points and connects to the frame assembly at each end thereof. A binder coacts with the band member to effect a predetermined shortening of the band member when a binder actuator element is displaced from a first position to a second position to displace the center portion of the frame inwardly and thereby resiliently preload tension within the band member independently of loading of the tree stand. The tree standoff points are configured to limit their penetration into the tree. The binder can be locked with the actuator element in its second position to deter unauthorized removal of the tree stand.

17 Claims, 2 Drawing Sheets

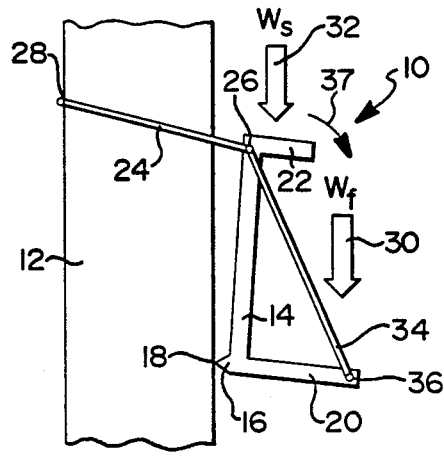
PRIOR ART
FIG 1
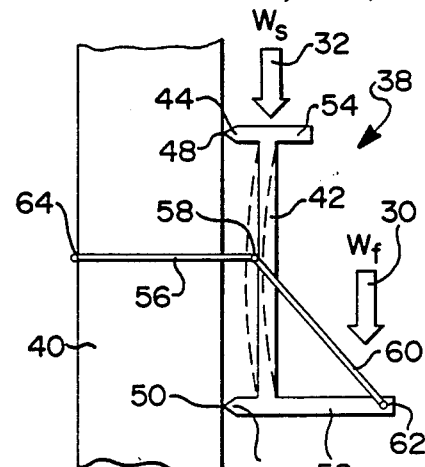
FIG 2
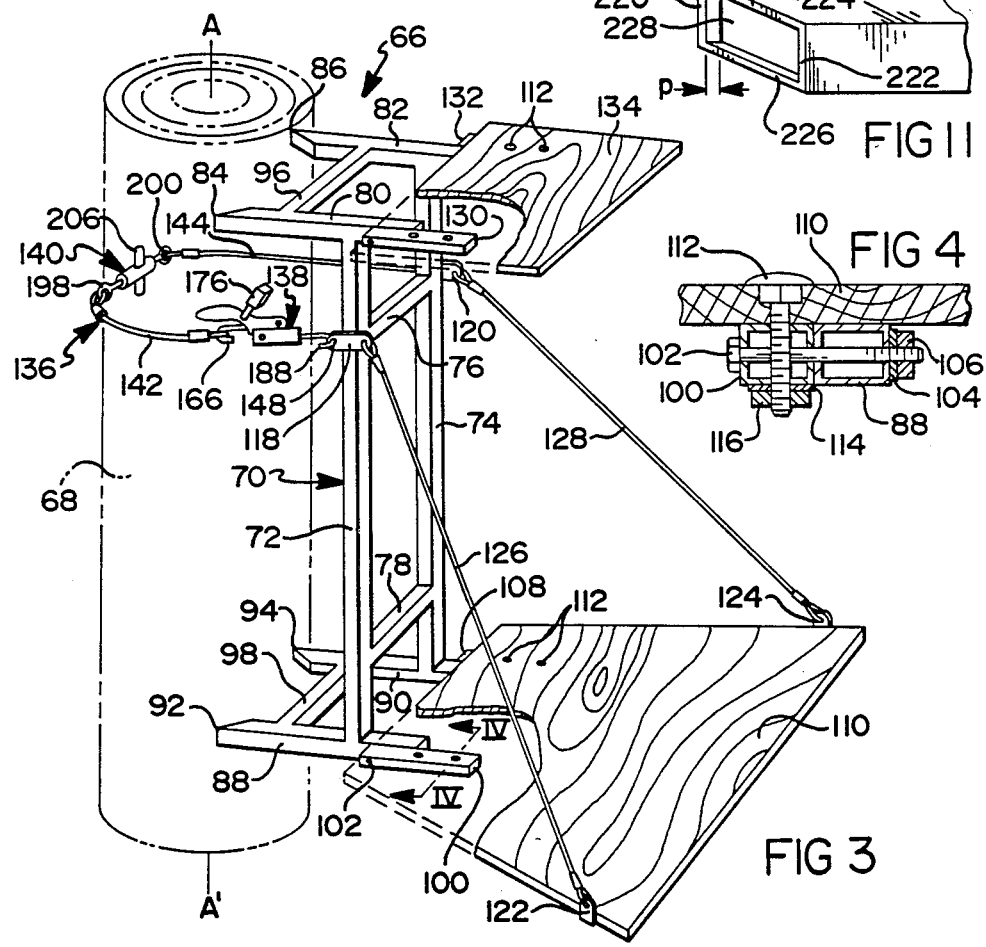

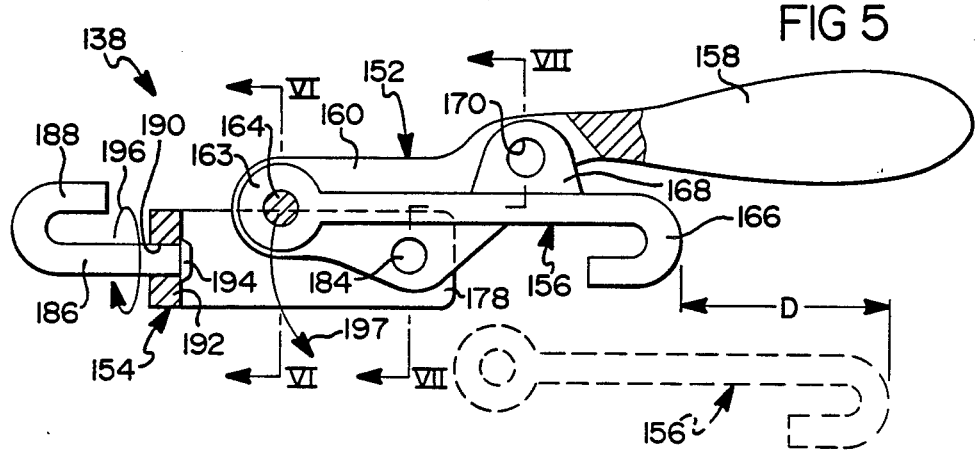
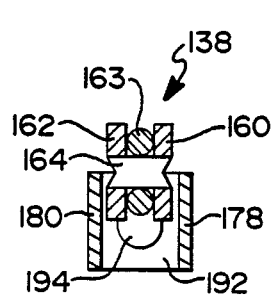
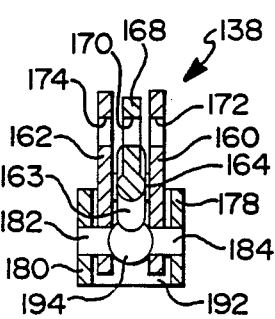
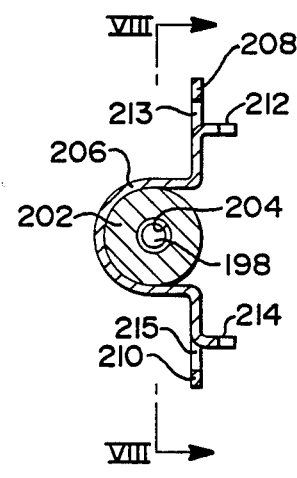
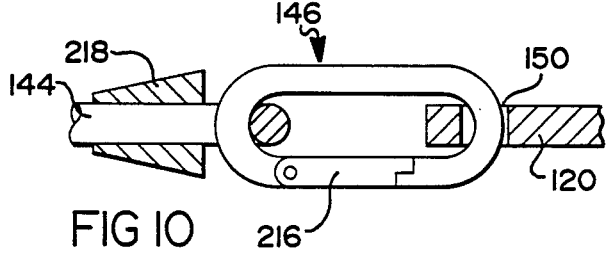
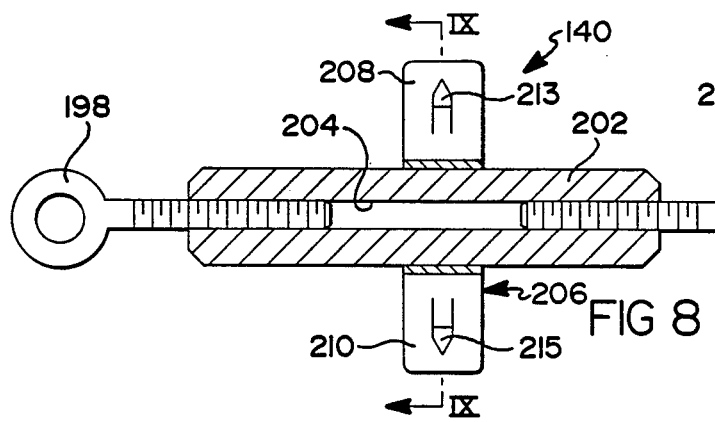

THEFT RESISTANT PORTABLE TREE STAND WITH ENHANCED STABILITY

TECHNICAL FIELD

The present invention relates to portable support structures adapted for secured mounting to a vertically disposed column, and, more particularly, to apparatus enabling persons to sit and stand comfortably and unobtrusively in an elevated position within a tree.

BACKGROUND OF THE INVENTION

Various equipment has been developed to assist outdoorsmen to sit or stand unobtrusively while in the field. The advantages of conducting related activities, particularly hunting, from an elevated position have long been recognized. An elevated position not only enhances the individual's field of vision, but also assists his topographical perspective in sighting game and estimating distances. Furthermore, a hunter tends to discharge his weapon downwardly and, thus, an errant shot is less likely to strike an object situated beyond the intended target.

Although hunters tend to take advantage of natural topography such as hills, rock outcroppings, ravines and the like to provide an enhanced field of vision, many types of game are found in relatively flat areas where such vantage points are not accessible. In such circumstances, artificial means of providing an elevated position are desirable. One type of device commonly employed is a freestand. Such stands, as typified in U.S. Pat. No. 4,674,598, are akin to a step ladder and do not require external support. However, such devices are usually large, unwieldy, and difficult to transport to a hunting area. Furthermore, being a man made object, they tend not to blend in with the natural surroundings and are difficult to camouflage, alerting potential game to the hunter's presence. Finally, like step ladders, they tend to be unsupported and can be unstable.

Stability of hunter's stands is deemed at a critical feature. By definition, such devices provide a seating or standing position for a hunter a substantial distance above the ground. A hunter possesses dangerous instrumentalities such as archery equipment, fire arms, knives, etc., requiring his full attention for safe utilization. An unstable stand can distract the hunter and lead to an accident. Furthermore, many hunting seasons take place in the winter time or during adverse weather wherein the stand can be ice or snow covered. Finally, hunters can be untrained and/or undisciplined wherein in the excitement of sighting game, they overlook fundamental safety rules leading to injury.

A second type of stand frequently employed is a tree ladder which is akin to an extension ladder, having the base thereof on the ground and the top resting against a tree or other vertically extending object. Examples are illustrated in U.S. Pat. Nos. 4,592,446 and 4,614,252. Although tree ladders provide a substantial vertical elevation to the hunter, they tend to have most of the disadvantages of freestands, namely they are large, cumbersome and difficult to put in place in the field as well as limited in height. They are likewise difficult to camouflage from the intended game and, like the freestand, require a firm horizontal support surface. Both of the foregoing types of stands are thus ill suited for use in uneven terrain.

The most common equipment employed by hunters and sportsmen to provide a vertically elevated vantage point in areas of flat topography is a stand which is entirely supported by a vertical column such as a tree. Such devices have inherent advantages over those described herein above. Specifically, they tend to be highly portable, light weight, and relatively small. Accordingly, they can easily be transported into the field and installed on a substantially vertical portion (trunk) of a tree. Being small, such devices are more easily camouflaged to blend in with the trees foliage and thus be less detectable by the intended game. Tree stands are essentially independent of local topography and provide enhanced stability by virtue of their exclusive attachment to the host tree.

There are two basic types of tree supported stands. The first is this flexible sling type which is attached like a hammock to two spaced branches and having an intermediate seating portion. Such a device is described in U.S. Pat. No. 4,759,425. Also see U.S. Pat. No. 4,687,074. Devices of this type have many advantages to those described herein above, namely they are extremely light weight and portable, are easily camouflaged and can be easily mounted to a tree. However, such devices have certain shortcomings. Being flexible, the seat, in use, can move with respect to the tree, thus drawing attention to the hunter. Additionally, the material can stretch and require periodic adjustment. Furthermore, the sling type seat must be disposed between two structurally sound branches, thereby limiting flexibility in selecting placement within the tree. Finally, because the supporting branches are spaced from the seating portion of the sling, the user may or may not have sufficient hand holds to safely assist his entry and egress from the seat.

The second type of tree supported stand involves a rigid frame which is attached to a vertical portion of the tree trunk. A seat and foot rests depend generally horizontally from the frame which is attached from the tree by an embracing band attached to the upper portion of the frame. As will be described in greater detail herein below, such tree supported stands are of the cinch type wherein the point of connection of the tree encircling band with the tree is substantially above its point of attachment to the frame. In use, the weight of the hunter tends to press the entire frame downwardly, tipping the lowermost portion thereof into the tree. The strap remains fixed against the backside of the tree trunk whereby a cinching action takes place with the tree stand gripping and thus deriving its attachment at the above described opposed vertically spaced points. By virtue of its direct attachment to the tree, the cinch type stand provides the most secure attachment to the tree.

Although the most common type of tree stand, the cinch type suffers from several serious drawbacks. First, because the frame and tree encircling members are typically rigid and of fixed dimension, such stands are often limited to a particular range of tree trunk dimension with which they can be safely employed. Some types of stands permit mechanical reconfiguration in the field. However, such reconfiguring involves carrying tools into the field as well as the use of numerous small parts and fasteners which are prone to come loose and/or become lost. A more serious shortcoming of cinch type tree stands is inherent in their design. Because of their cinching action, such stands are prone to unexpected release wherein the binding action of the frame and support member is lost and the entire stand drops with possible injury to the user. A related problem lies in the fact that cinch type stands are typically secure only under load, that is, when the hunter is actually sitting or standing thereon. As the user is getting on or off of the stand, it is prone to release as described above. Furthermore, even under the best of circumstances, the loading of cinch type stands is entirely vertical and, thus, in use, the cinch type stands can be prone to lateral sway inasmuch as they do not provide meaningful horizontal stability between the frame and tree.

Additional drawbacks of some tree stands lie in their use of fabric cinching bands which can stretch, providing an unlevel standing or sitting surface and promote unexpected release of the stand. Lastly, many designs employ tree engaging points which are extremely sharp which, when loaded, tend to penetrate the tree in an uncontrolled manner (to an unknown depth) which can loosen the stands grip of the tree and also cause unexpected release.

Although providing a number of advantages over freestands and leaning stands, particularly unlimited vertical positioning, tree supported stands have a final shortcoming common thereto. Commercially available tree stands typically fail to provide for adequate securing of the stand to the tree. Because stands are employed in remote locations, they are prone to theft. Semipermanently attaching the stand to the tree via nails, bolts or other suitable fasteners is frequently not an acceptable alternative as they can damage the tree, may be illegal, and requires tools for their adoption.

Although the present invention shall be described in its preferred application as a hunter's tree stand, it is to be understood that other equally suitable applications therefore are contemplated.

BRIEF DESCRIPTION OF THE INVENTION

The present invention provides a new and improved portable tree stand which provides extremely rigid and secure attachment to its host tree in both vertical and lateral directions while minimizing damage through penetration into the tree. Furthermore, the stand is extremely light weight and portable and provides a wide range of adjustment without the use of tools and loose small parts for adaptation to a large range of tree trunk diameters. Finally, the present tree stand is readily lockable for secured unattended semi-permanent installation.

In the broadest sense, the present invention provides a portable support structure which is adapted for mounting to a vertically disposed column. The structure includes a vertically elongated frame member defining first and second vertically spaced sets of column contact points. One of the sets of contact points comprises at least one point and the other of the sets comprises at least a pair of laterally spaced points. Attachment means are disposed on said frame at a location vertically intermediate the set of column contact points. An elongated inelastic band member is provided for girdling the support column within a generally horizontal plane and is affixed to the attachment means. Finally, binder means are provided including an actuator element co-acting with the band member to effect a predetermined axial shortening of the band member when the actuator element is displaced from a first position to a second position whereby the frame member will resiliently preload tension within the band member. This arrangement has the advantage of providing compressive loading of the frame member against the column at points above and below the plane of the binder encircling the column. This form of attachment provides secure vertical and lateral attachment independent of the loading condition of the support structure.

According to the preferred embodiment of the invention, the portable support structure comprises a vertically elongated frame member defining a first pair of laterally spaced horizontally extending column contact points disposed adjacent the lower end of the frame member, a second pair of laterally spaced horizontally extending column contact points disposed adjacent the upper end of the frame contact member, and first and second attachment points disposed vertically intermediate said pairs of column contact points. Seat means are carried by the frame member adjacent the upper end thereof and platform means are carried by the frame member adjacent the lower end thereof. An elongated inelastic band member having a characteristic axial dimension girdles the support column in a generally horizontal plane including a first end affixed to the first attachment point and the second end attached to the second attachment point. Finally, binder means are provided including an actuator element co-acting with the band member to effect a predetermined fixed axial shortening of the band member when the actuator element is displaced from a first position to a second position whereby the frame member will resiliently preload tension within the band member. This arrangement has the advantage of providing two pairs of laterally spaced column contact points which are continuously held in an abutting relationship with the vertically disposed column to provide both lateral as well as vertical support to the structure.

According to another aspect of the invention, means are provided to bias the actuator element into the second position. This arrangement has the advantage of ensuring that the binder remains in its foreshortened or column engaging condition.

According to another aspect of the invention, the band member further comprises an infinitely variable axial dimension adjuster. This arrangement has the advantage of providing infinite adjustment to the band member to increase the range of column girths that it can accommodate. Furthermore, the infinitely variable length adjustment means effectively provides a fine adjustment in combination with the coarse adjustment in band member lengths afforded by the binder.

According the another aspect of the invention, the adjustment means comprises a turnbuckle including first and second axially aligning eye-bolts respectively serially affixed to segments of the band member and an intermediate adjuster threadably engaging the eye-bolts, the adjuster including a radially extending portion operative to prohibit rotation upon said eye-bolts in application when the actuator element is in said second position. This arrangement enhances security of an installed stand by preventing adjustment of the band member length after installation of the structure.

According to another aspect of the invention, means are provided to lock the actuator element in the second position. This arrangement has the advantage of providing unattended security to the support structure.

According to another aspect of the invention, the band member further comprises interchangeable quick-connect means respectfully interconnecting said first and second attachment points and said first and second band member ends. This arrangement has the advantage of providing versatility of the band member upon the attachment points whereby the binder can be operated from either side of the support structure.

According to still another aspect of the invention, the platform means provides a generally rectangular portion pivotally affixed to the frame member adjacent one edge thereof and guyed to said frame member between an oppositely opposed edge on a frame member guy support location vertically adjacent said attachment points. This arrangement provides enhanced rigidity without effecting band tensioning.

These and other features and advantages of the present invention will become apparent upon reading the following specification which, along with the patent drawings describes and discloses a preferred embodiment of the invention in detail.

A detailed description of the embodiment of the invention makes reference to the accompanying drawings.

BRIEF DESCRIPTION OF THE DRAWINGS

FIG. 1 is a schematic view of a prior art cinching type tree stand installed on a vertical column;

FIG. 2 is a schematic view of a tree stand embodying the present invention installed on a column;

FIG. 3 is a cut away perspective view of the preferred embodiment of the portable tree stand mounted to a vertically disposed tree trunk;

FIG. 4 is a broken cross sectional view taken on lines IV—IV of FIG. 3;

FIG. 5 is a cross sectional view taken on an enlarged scale of a binder employed in FIG. 3;

FIG. 6 is a cross sectional view of the binder taken on line VI—VI of FIG. 5;

FIG. 7 is a cross sectional view of the binder taken on lines VII—VII of FIG. 5;

FIG. 8 is a cross sectional view on an enlarged scale of an infinite band member adjuster taken on lines VIII—VIII of FIG. 9;

FIG. 9 is a cross sectional view of the adjuster taken on lines IX—IX of FIG. 8;

FIG. 10 is a cross sectional view of a typically quick-connector employed with a band member in the installation of FIG. 3; and FIG. 11 is a perspective broken view on an enlarged scale of a tree contact point of the tree stand of FIG. 3.

DETAILED DESCRIPTION OF THE PREFERRED EMBODIMENT OF THE INVENTION

Referring to FIG. 1, a typical prior art cinch type tree stand 10 is illustrated in schematic form mounted to a column such as the vertical portion of a tree trunk 12. The tree stand 10 comprises a generally vertically extending frame member 14 spaced from tree 12 by a contact point 16 extending inwardly from the lower end of frame member 14. Contact point 16 contacts tree 12 at a point designated 18. A platform 20 depends generally horizontally outwardly from the lower end of frame 14. Likewise, a seat 22 depends generally horizontally outwardly from the upper end of frame member 14. A band member 24 encircles tree trunk 12 and has both ends thereof secured to a mounting point 26 at the upper end of frame 14. The point of principle contact between band member 24 and tree 12 is at point 28.

Prior art tree stand 10 operates by cinching, that is point 28 is held vertically constant as frame 14 is positioned against tree 12. As stand 10 is loaded by the weight of a hunter bearing down thereupon, it is loaded as indicated by arrow $W_f$ 30 to the extent that the hunter is standing on platform 20 and upon seat 22 by force designated $W_s$ 32 to the extent the hunter is sitting upon seat 22. In either case, a center line of the force being applied by the hunter's weight, being horizontally spaced from tree point 18, frame member 14 will tend to pivot outwardly thereabout (clockwise as viewed in FIG. 1) as indicated by arrow 37 thereby maintaining band member 24 in a taught condition. A guy member 34 interconnects mounting point 26 with a platform point 36 to lend additional support to frame member 14.

When weights $W_f$ 30 or $W_s$ 32 are reduced significantly, such as when the hunter is just stepping off or on to the tree stand 10, the point loading at 18 is substantially eliminated. If, at that time, an upward force is inadvertently applied to frame member 14 such as being bumped by a nearby branch or the hunter as he is climbing tree 12, contact point 16 of frame member 14 can actually lose contact with tree 12 whereby tension in band member 24 is lost and tree stand 10 conceivably will slide down tree trunk 12.

Referring to FIG. 2, the preferred embodiment of a tree stand 38 of the present invention is illustrated in schematic form mounted to a tree trunk 40. Tree stand 38 includes a vertically disposed elongated frame member 42, a first contact point 44 depending inwardly from the upper end thereof and a second contact point 46 depending inwardly from the lower end thereof. Contact points 44,46 bear against tree trunk 40 at points 48,50, respectively, and serve to hold frame member 42 in a spaced, generally parallel relationship with tree trunk 40.

A platform 52 depends outwardly from the lower end of frame member 42 and a seat 54 is affixed at the upper end of frame member 42. An inelastic band member 56 encircles tree trunk 40 within a generally horizontal plane and is attached at both ends thereof to frame member 42 at attachment point 58. A guy member 60 extends from attachment point 58 to a platform point 62. Band member 56 has a principle point of contact with tree trunk 40 at point 64.

When tree stand 38 is mounted to tree 40, band member 56 is shortened to preload points 44,46 against tree 40 by the elastic deformation or resilient bending of frame member 42 as indicated in phantom into the space between tree 40 and frame member 42 in its unloaded position. Thus, points 44,46 are retained in intimate contact with tree 40 under all loading conditions independent of user applied loading at arrows 30,32. This arrangement ensures that tree stand 38 will remain in its mounted position independent of inadvertent side and upward loading.

Referring to FIGS. 3 and 4, the structural details of the preferred embodiment of a tree stand 66 are illustrated mounted to a tree trunk 68 indicated in phantom. Tree stand 66 includes a frame 70 including two parallel vertical members 72,74 rigidly interconnected in a fixed relationship by upper and lower cross members 76,78, respectively. A pair of tree standoff members 80,82 depend inwardly from the uppermost end of vertical members 72,74, respectively, and terminate adjacent tree trunk 68 in tree contact points 84,86, respectively. Likewise, a second pair of tree standoff members 88,90 depend inwardly from the lower end of members 72,74, respectively, terminating in tree contact points 92,94, respectively. Standoff members 80,82 and 88,90 are interspaced by upper and lower cross members 96,98, respectively. Members 72,74,76,78,80,82,88,90, 96, and 98 are all formed from rectangular section mild steel tubing which has been welded in the illustrated configuration. The above recited elements comprise a single rigid structure. It is contemplated, however, that other materials and fabrication techniques could be substituted without departing from the spirit of the present invention.

Tree standoff member 88 extends outwardly beyond member 72. As can best be seen in FIG. 4, the outwardly extending end of standoff member 88 supports a hinge plate 100 which is pivotally affixed thereto by a suitable hinge pin bolt 102 held in assembly with a mating lock washer 104 and nut 106. Standoff member 90 has a similar outwardly projecting portion with a second hinge plate 108 pivotally mounted thereto with a bolt (not illustrated) disposed coaxially with bolt 102. A trapezoidal platform 110 is mounted to the outer ends of hinge plates 100 and 108 through registering apertures by carriage bolts 112 with suitable lock washers 114 and nuts 116.

Attachment point brackets 118,120 are rigidly affixed to vertical members 72,74 at points intermediate the ends thereof and adjacent cross member 76. The outer lateral corners of platform 110 have attachment brackets 122,124 affixed thereto by screws (not shown) or other suitable fastening means. Steel cable guys 126,128 interconnect brackets 118,122 and 120,124, respectively, to provide support to platform 110 when it is in its lowered position. Platform 110 is constructed of plywood, slit metal sheet or other suitable material. Additionally, it is contemplated that the entire assembly would be painted with camouflage paint to help blend it in with its surroundings.

Standoff members 80,82 have outwardly extending portions pivotally attached to hinge plates 130,132, respectively in the same manner as described below with respect to hinge plate 100. Likewise, a generally rectangular seat 134 constructed of plywood or of other suitable material is affixed to hinge plates 130,132 with hardware similar to that described with respect to FIG. 4. When tree stand 66 is mounted to a tree 68 but not in use, it is contemplated that platform 110 and seat 134 would be folded upwardly to assume a generally vertical orientation to prevent the accumulation of water or snow thereon and to provide a dry surface during the next use thereof. Friction upon rotation between frame 70 members and hinge plates 100,108,130, 132 tends to restrain platform 110 and seat 134 in their selected stored or deployed positions.

Tree stand 66 is held in contact with tree trunk 68 by an elongated inelastic radially resilient band member shown generally at 136. Band member 136 comprises a binder assembly 138, and infinitely adjustable turnbuckle assembly 140, first and second interconnecting steel cables 142,144 and a quick-connect link 146 (illustrated in FIG. 10) interconnected in series between connecting point apertures 148,150 formed in attachment point brackets 118,120, respectively. Detailed operation of band member 136 is discussed herein below. Definitionally, band member 136 is inelastic axially and resilient radially, meaning that it will readily conform about the circumference of the tree 68, but will not yield significantly lengthwise.

Referring to FIGS. 5-7, the details and operation of binder assembly 138 are illustrated. Assembly 138 comprises a toggle link actuator 152, a generally U-shaped frame 154 and a draw hook 156. Toggle link actuator 152 includes a handle 158 bifurcated into parallel spaced side portions or members 160,162, respectively. Draw hook 156 has an annular mounting ring 163 formed at one end thereof which is entrapped between side portions 160,162 and is pivotally connected to side portions 160,162 via a swedged connecting pin 164. The other end of draw hook 156 terminates in a hook portion 166. A locking web 168, is integrally formed with an intermediate portion of draw hook 156 and has a bore 170 there through. Side portions 160,162 have bores 172,174, respectively, in co-registration with bore 170 for receiving a lock 176 as illustrated in FIG. 3.

Side portions 160,162 of actuator 152 are entrapped between leg portions 178,180 of frame 154. The free ends of leg portions 178,180 are separately pivotally connected to side portions 160,162 by pins 182,184, respectively. Pins 164,182,184 are pined or swedged over to permit relative rotation between their respective mating components while retaining axial positioning as illustrated in FIGS. 6 and 7. Referring to FIG. 5, pin 184 is positioned intermediate pin 164 and hook portion 166.

A connecting member 186 has one end formed in a hook configuration 188 and the other end thereof passing loosely through an aperture 190 formed in a base portion 192 of frame 154. Connecting member 186 is mushroomed at head 194 or otherwise deformed to retain it in its illustrated position but permit relative rotation as indicated by arrow 196 within frame 154.

In assembly as illustrated in FIG. 3, draw hook 156 is connected to one looped end of cable 142. Hook 188 is interconnected to attachment point bracket 18 through aperture 148.

Binder assembly 138 is an over center device which operates to draw hooks 166,188 horizontally together (as viewed in FIG. 5) as handle 158 is displaced clockwise about pins 182,184 from a first position wherein handle 158 is abutting base portion 192 to a second position (illustrated) in which apertures 170,172,174 are in alignment. The opposite displacement (release) of handle counter clockwise from the second (illustrated) position to the first position is illustrated by arrow 197. In displacing handle 158 from the above-described first position to the illustrated second position, the hooks 166,188 are drawn toward one another by a fixed dimension D. In the foregoing description, this action serves to effectively reduce the overall length band member 136 by a fixed dimension D.

Being an over center device, binder assembly 138 will tend to self-bias itself into one or another of the above-described handle positions whenever it is under continuous, outwardly opposed preloading at hooks 166,168. For example, as viewed in FIG. 5, when such loading exists and pin 164 is above pin 184, the preloading between hooks 166,168 will tend to continue to rotate handle 158 clockwise. Conversely, if handle 158 moved to an intermediate position wherein pin 164 rotates to a position below the horizontal plane of pin 184, the preloading between hooks 166,188 will tend to rotate handle 158 counter clockwise. Accordingly, definitionaly, binder assembly 138 is deemed to be self-biasing, that is, whenever handle 158 is at or near the illustrated second position, in application, handle 158 is continuously biased toward the illustrated second position.

Referring to FIGS. 8 and 9, turnbuckle assembly 140 is illustrated in detail including a pair of oppositely directed coaxially disposed eye-bolts 198 and 200 interconnected by an annular adjustment member 202 defining a single threaded bore 204 there through receiving the threaded portions of eye-bolts 198,200. Turnbuckle assembly 140 operates as any conventional turnbuckle, that is if eye-bolts 198,200 were held from rotational displacement, and adjuster member 202 were rotated, the interspacing between eye-bolts 198,200 could be infinitely variably adjusted as indicated by d. A steel wing bracket 206 is affixed to the outer surface of adjustment member 202 and includes a generally U-shaped center portion embracing the outer surface of adjustment member 202 and two outwardly depending wing portions 208,210 extending generally tangentially therefrom. Barbs 212,214 are normally staked leftwardly from wings 208,210, respectively, as viewed in FIG. 9, to form nail receiving holes 213,215 within wings 208,210, respectively. The material of wings 208,210 adjacent holes 213,215 also serves to abut the outer surface of tree 68 to limit penetration of barbs 212,214.

When placed in assembly within band 136, the remaining end of cable 142 is looped through eye-bolt 198. Likewise, one end of cable 144 is looped through eye-bolt 200. The remaining end of cable end 144 is looped through quick-connect link 146 which, in turn, is interconnected to attachment point bracket 120 via connecting point aperture 150 form therein. The tip to tip dimension of wings 208,210 is selected as a function of dimension D of binder assembly 138 whereby in application illustrated in FIG. 3, when binder assembly handle 158 is in its first position and draw hook 156 is in the position illustrated in phantom in FIG. 5, dimension D is added as an additional length to band member 136. This enables turnbuckle adjustment member 202 to be rotated freely to provide a fine adjustment of band member 136. Once turnbuckle assembly 140 is in its desired position, adjustment member 202 is turned so that wings 208,210 are essentially vertically disposed and handle 158 of binder assembly 138 is moved from its first position to its second (illustrated) position thereby reducing the effective overall length of band member 136 by the dimension D. This reduction in length will remove all slack from band member 136, press the barbs 212,214 of turnbuckle assembly 140 into the back side of tree trunk 68 for additional retention and, finally, preload vertical member 72,74 as described in connection with FIG. 2 to maintain a significant level of tension within band member 136 independent of the presence or absence of the load upon platform 110 and/or seat 134.

Once installed and lock 176 placed through registering apertures 170,172,174 in binder assembly 138, tree stand 66 cannot be removed without cutting or breaking one of the elements of band member 136. It is contemplated that the elements are constructed of robust material and design, rendering unauthorized removal of tree stand 66 improbable.

FIG. 10 illustrates the use of a conventional quick-connect link 146 interconnecting the remaining end of cable 144 and attachment point bracket 120. Link 146 has a spring loaded hinged closure member 216 that prevents inadvertent loss or disconnection of band member 136 during the installation process. Frame 70 is constructed symmetrically whereby link 216 can be removed from bracket 120 and attached to bracket 118 and, coversely, hook 188 of binder assembly 138 can be removed from bracket 118 and interconnected to bracket 120 through aperture 150 therein. Definitionally, hooks 166,188 are deemed to be equivalent to quick-connect links.

Each end of cables 142,144,126,128 are looped and permanently wrapped, swaged, welded or otherwise affixed to insure permanent and rigid construction. FIG. 10 illustrates a sample sleeve 218 that could be pressed over the looped end of cable 144 for permanent retention.

Referring to FIG. 11, the tree contact point 86 portion of standoff member 82 is illustrated on an enlarged scale to highlight the tree penetration limiting feature of the present invention. The following description is equally applicable to tree contact points 84,86,92,94. Frame 70 is constructed of square or rectangular section steel tubing. The end of standoff member 82 that is to define tree contact point 86 is cut at an oblique angle to define a tree contacting surface comprising two spaced vertically extending portions 220,222 and two spaced horizontally extending portions 224,226. Tree contacting surface portions 220,222,224,226 all fall on a common plane which is nominally tangential to the outer surface of tree trunk 68 whereby upon installation, all four surface portions will be at nominal contact with the tree trunk 68 when it is of an ideal diameter. Surfaces 220,222,224,226 will tend to penetrate into the bark of tree trunk 68 due to the loading established by band member 136. A plug or web 228 is rigidly disposed within standoff member 82 at a fixed depth designated p from surfaces 220–226. Plug 228 thereby limits penetration of contact point 86 into tree trunk 68 to a dimension p whereinafter plug 228 will contact the outer portion of tree trunk 68 and prevent further penetration. This feature not only protects the tree from damage due to excessive penetration of contact points 84,86,92,94, but also ensures that band member 136 will not become slack as a result thereof. Definitionaly, the contact point is intended to comprise a collective tree engaging surface area of portions 220,222,224,226.

It is to be understood that the invention has been described with reference to a specific embodiment to provide the features and advantages previously described in that such specific embodiment is susceptible to modification, as will be apparent to those skilled in the art. For example, it is contemplated that binder 138 and turnbuckle 140 could be incorporated into a single assembly. Furthermore, chains, steel bands or other suitable members could be substituted for cables 142,144. Furthermore, binder 138 could be parallel or series connected with band member 136. Accordingly, the foregoing is not to be construed in a limiting sense.

What is claimed is:

1. A portable support structure adapted for mounting to a vertically disposed column, said support structure comprising:
   a vertically elongated frame member defining a first pair of laterally spaced horizontally extending column contact points disposed adjacent the lower end of said frame member, a second pair of laterally spaced horizontally extending column contact points disposed adjacent the upper end of said frame member, and first and second attachment points disposed vertically intermediate said pairs of column contact points;
   seat means carried by said frame member adjacent the upper end thereof;
   platform means carried by said frame member adjacent the lower end thereof;
   an elongated, inelastic band member having a characteristic dimension girdling said support column within a generally horizontal plane, a first end affixed to said first attachment point and a second end affixed to said second attachment point, said band member further comprising an infinitely variable length adjusting turnbuckle including first and second axially aligned eye-bolts respectively serially affixed to segments of said band member and an intermediate adjuster threadably engaging said eye-bolts, said adjuster including a radially extending portion operative to prohibit rotation upon said eye-bolts in application when said actuator element is in said second position; and binder means including an actuator element co-acting with said band member to effect a predetermined fixed shortening of said band member dimension when said actuator element is displaced from a first position to a second position whereby said frame member will resiliently preload tension within said band member.

2. The support structure of claim 1, further comprising means operative to bias said actuator element into said second position.

3. The support structure of claim 1, wherein said binder means is operative to self-bias said actuator element into said second position in response to said band member preload tensioning.

4. The support structure of claim 1, wherein said band member comprises a link chain.

5. The support structure of claim 1, wherein said band member comprises a braided cable.

6. The support structure of claim 1, wherein said pairs of horizontally extending column contact points co-act to maintain said frame member in a spaced, generally parallel orientation with respect to said column.

7. The support structure of claim 1, further comprising means operative to lock said actuator element in said second position.

8. The support structure of claim 1, wherein said platform means comprises a generally rectangular platform portion pivotally affixed to said frame member adjacent one edge thereof and guyed to said frame member between an oppositely opposed edge and a frame member guy support location vertically adjacent said attachment points.

9. The support structure of claim 1, wherein said band member further comprises interchangeable, quick-connect means respectively interlocking said first and second attachment points and said first and second band member ends.

10. The support structure of claim 1, wherein said radially extending portion comprises at least one column engaging barb depending therefrom.

11. The support structure of claim 1, wherein said tree contact points are constructed of tubular material cut in a vertical plane tangential to said column.

12. The support structure of claim 11, further comprising means operative to limit penetration of said contact points into said column.

13. The support structure of claim 12, wherein said penetration limiting means comprising a planar member defining a column abutment surface disposed generally tangentially to said column within said contact point tube.

14. A portable stand adapted for mounting to a vertically disposed tree trunk and entirely supported thereby, said stand comprising:

a frame including two vertically elongated frame members, at least one cross support rigidly retaining said frame members in a generally parallel, laterally spaced orientation, an upper pair of horizontally extending tree standoff contact points depending from the respective upper ends of said frame members, a lower pair of horizontally extending tree standoff contact points depending from the respective lower ends of said frame members, said two pairs of contact points terminating in a generally vertically coplanar orientation, each said standoff point being constructed of tubular material cut in a vertical plane tangential to said tree trunk and including a tree trunk penetration limiting member disposed within said standoff point tube, said penetration limiting member defining a tree abutment surface disposed generally tangentially to said tree trunk, said frame further including first and second attachment elements affixed to said respective frame members vertically intermediate said upper and lower pairs of contact points;

a platform carried by said frame members adjacent the lower ends thereof and pivotally affixed to said frame for selective displacement between a generally vertical stored position and a generally horizontal in-use position;

a seat carried by said frame members adjacent the upper ends thereof and pivotally affixed to said frame for selective displacement between a generally vertical position for storage and in-use standing, and a generally horizontal in-use seated position;

an elongated, axially inelastic radially resilient band member having a characteristic axial dimension which, in application, girdles said tree trunk within a generally horizontal plane, a first end interconnected to said first attachment element by a first quick-connect link and a second end interconnected to said second attachment element by a second quick-connect link, said first and second quick-connect links being mutually interchangeable; and a binder including an actuator co-acting with said band member to effect a predetermined fixed axial shortening of said band member when said actuator is displaced from a first position to a second position whereby said frame member will resiliently preload tension within said band member and thereby retain said two pairs of contact points in continuous, horizontal compressive loading against said tree trunk.

15. The portable stand of claim 14, wherein said at least one cross support comprises a plurality of vertically spaced ladder-like hand hold cross supports.

16. The portable stand of claim 14, wherein said band member further comprises an infinitely variable length adjustment means.

17. The portable stand of claim 16, wherein said adjustment means comprises a turnbuckle including first and second axially aligned eye-bolts respectively serially affixed to segments of said band member and an intermediate adjuster threadably engaging said eye-bolts, said adjuster including a radially extending portion operative to prohibit rotation upon said eye-bolts in application when said actuator is in said second position.

* * * * *